United States Patent
Funabashi et al.

(10) Patent No.: US 10,637,078 B2
(45) Date of Patent: Apr. 28, 2020

(54) FUEL CELL

(71) Applicant: KABUSHIKI KAISHA TOYOTA CHUO KENKYUSHO, Nagakute-shi, Aichi (JP)

(72) Inventors: Hirofumi Funabashi, Nagakute (JP); Teruhisa Akashi, Nagakute (JP); Hiroko Iguchi, Nagakute (JP); Hidehito Matsuo, Nagakute (JP); Shigeo Hori, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 122 days.

(21) Appl. No.: 15/891,956

(22) Filed: Feb. 8, 2018

(65) Prior Publication Data

US 2018/0248205 A1    Aug. 30, 2018

(30) Foreign Application Priority Data

Feb. 24, 2017    (JP) ................. 2017-033389

(51) Int. Cl.
| | |
|---|---|
| *H01M 8/0289* | (2016.01) |
| *H01M 8/1016* | (2016.01) |
| *H01M 8/1007* | (2016.01) |
| *H01M 8/1097* | (2016.01) |
| *H01M 8/1004* | (2016.01) |
| *H01M 8/2425* | (2016.01) |
| *H01M 8/0267* | (2016.01) |

(Continued)

(52) U.S. Cl.
CPC ....... *H01M 8/0289* (2013.01); *H01M 8/1004* (2013.01); *H01M 8/1007* (2016.02); *H01M 8/1016* (2013.01); *H01M 8/1097* (2013.01); *H01M 8/2425* (2013.01); *H01M 8/0267* (2013.01); *H01M 8/1246* (2013.01); *H01M 2008/1293* (2013.01)

(58) Field of Classification Search
CPC ............. H01M 8/0289; H01M 8/1007; H01M 8/1004; H01M 5/1016; H01M 8/1097; H01M 8/2425; H01M 8/0267; H01M 8/1246

See application file for complete search history.

(56) References Cited

U.S. PATENT DOCUMENTS

2003/0039874 A1* 2/2003 Jankowski .......... H01M 8/1097
                                                                429/434
2007/0087235 A1    4/2007 Kim et al.

FOREIGN PATENT DOCUMENTS

| JP | 2004-111307 A | 4/2004 |
| JP | 2006-065770 A | 3/2006 |
| JP | 2006-520996 A | 9/2006 |

(Continued)

*Primary Examiner* — Helen Oi K Conley
(74) *Attorney, Agent, or Firm* — Oliff PLC

(57) ABSTRACT

A fuel cell disclosed herein may comprise: a substrate provided with a recess through which fuel gas passes; an electrolyte membrane covering an opening of the recess; an insulating film covering one surface of the electrolyte membrane and having a through hole reaching the electrolyte membrane; a first electrode in contact with the one surface of the electrolyte membrane in the through hole; a second electrode in contact with the other surface of the electrolyte membrane; and a heater disposed in the insulating film at a position adjacent to the through hole.

6 Claims, 14 Drawing Sheets

(51) Int. Cl.
*H01M 8/124* (2016.01)
*H01M 8/1246* (2016.01)

(56) References Cited

FOREIGN PATENT DOCUMENTS

| | | |
|---|---|---|
| JP | 2007-115677 A | 5/2007 |
| JP | 2008-505453 A | 2/2008 |
| WO | 2004/004052 A2 | 1/2004 |
| WO | 2004/075375 A2 | 9/2004 |
| WO | 2006/004957 A2 | 1/2006 |

* cited by examiner

_US 10,637,078 B2_

FUEL CELL

TECHNICAL FIELD

The technique disclosed herein relates to a fuel cell. Especially, it relates to a fuel cell suitable for applying a MEMS (Micro Electro Mechanical Systems) technique, and that can heat an electrolyte membrane with a small amount of energy upon activation.

BACKGROUND

A fuel cell requires a high-temperature environment for facilitating reaction between hydrogen and oxygen. When hydrogen and oxygen start to react, the high-temperature environment is maintained by self-heat generation. However, upon activation of the fuel cell, the high-temperature environment needs to be realized by using external input of thermal energy. There are two types of fuel cells that realize the high-temperature environment upon the activation of the fuel cell. One uses a scheme that heats hydrogen fuel and sends the same to electrodes, and the other uses a scheme that heats a reaction region, that is, an electrolyte membrane interposed between two electrodes. Examples of the former are exemplified in Japanese Patent Application Publication Nos. 2007-115677, 2006-65770, and International Publication WO No. 2004/004052, and examples of the latter are exemplified in Japanese Patent Application Publication Nos. 2006-520996, 2004-111307.

On the other hand, a technique that manufactures a micro fuel cell using micro-fabrication techniques such as etching has been proposed in the recent years (for example, Japanese Patent Application Publication No. 2007-115677, International Publication WO No. 2004/004052). The technique that manufactures microminiature devices such as actuators and sensors using the micro-fabrication techniques such as etching is called a MEMS (Micro Electro Mechanical Systems) technique.

SUMMARY

A fuel cell employing the type that heats the fuel cell requires a heating unit other than its stack including an electrolyte membrane and electrodes on both sides thereof, which increases a device size. Fuel cells described in Patent Documents 4 and 5, which employ the type that heats the electrolyte membrane, each have a heater arranged to heat an entirety of the stack including the electrolyte membrane and the electrodes on both sides thereof. Due to this, heat transfers to a housing and the like which supports the stack, resulting in wasted thermal energy for heating the electrolyte membrane. That is, a large amount of energy is necessary to rapidly heat the electrolyte membrane. The present disclosure provides a technique suitable for applying a MEMS technique, and that can heat an electrolyte membrane with a small amount of energy.

A fuel cell disclosed herein may comprise: a substrate provided with a recess through which fuel gas passes; an electrolyte membrane covering an opening of the recess; an insulating film covering one surface of the electrolyte membrane and having a through hole reaching the electrolyte membrane; a first electrode in contact with the one surface of the electrolyte membrane in the through hole; a second electrode in contact with the other surface of the electrolyte membrane; and a heater disposed in the insulating film at a position adjacent to the through hole. In this fuel cell, hydrogen and oxygen react in a region of the electrolyte membrane corresponding to a bottom of the through hole. The heater arranged at the position adjacent to the through hole heats a reaction region of the electrolyte membrane that is right next to the heater. That is, the heater locally heats the reaction region of the electrolyte membrane. Due to this, the reaction region of the electrolyte membrane can be heated with a small amount of energy.

The insulating film may for example be a silicon nitride film, or a multilayer film of the silicon nitride film and a silicon oxide film. Further details of the technique disclosed herein and its improvements will be described in the following DETAILED DESCRIPTION.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved fuel cell, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
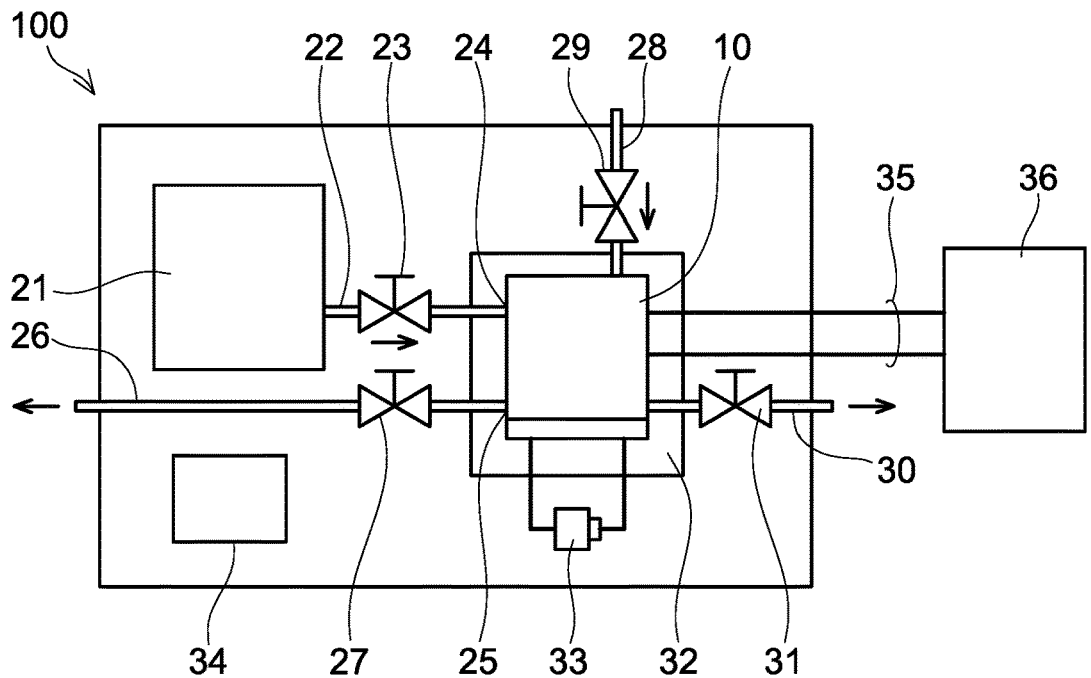
FIG. 1 is a block diagram of a fuel cell system including a fuel cell of an embodiment.

A fuel cell of an embodiment will be described with reference to the drawings. FIG. 1 shows a block diagram of a fuel cell system 100 including a fuel cell 10. The fuel cell system 100 adds peripheral devices to the fuel cell 10 inducing a stack of an electrolyte membrane and electrodes.

The fuel cell 10 is a solid oxide fuel cell (SOFC). A detailed structure of the fuel cell 10 will be described later with reference to FIGS. 2 to 4. Hydrogen, which is fuel of the fuel cell 10, is stored in a hydrogen gas cartridge 21. The hydrogen gas cartridge 21 and the fuel cell 10 are connected by a fuel supply pipe 22. A decompressor valve 23 is provided on the fuel supply pipe 22. One end of the fuel supply pipe 22 is connected to a fuel supply inlet 24 of the fuel cell 10. Highly compressed hydrogen in the hydrogen gas cartridge 21 is decompressed to a suitable pressure by the decompressor valve 23, and is supplied to the fuel cell 10. Most part of hydrogen reacts with oxygen in external air within the fuel cell 10 and turns into water. At this occasion, electron (that is, power) is generated. The water that resulted from the reaction with oxygen (and carbon dioxide generated thereby) within the fuel cell 10, and residual hydrogen that did not contribute to reaction are discharged from a discharge outlet 25. The discharge outlet 25 is connected to a discharge pipe 26, and water, carbon dioxide, and residual hydrogen are discharged to outside of the fuel cell system 100 through the discharge pipe 26. It should be noted that a fuel sealing valve 27 is provided on the discharge pipe 26. The external air containing oxygen is supplied to the fuel cell 10 through an air suction pipe 28. A shutoff valve 29 is provided on the air suction pipe 28.

The external air after the reaction is discharged to the outside through an air discharge pipe 30. A sealing valve 31 is provided on the air discharge pipe 30.

The solid oxide fuel cell (SOFC) generates power by causing hydrogen and oxygen to react by bringing its solid electrolyte membrane to a high temperature. The generated power is sent to a load device 36 (or a secondary battery) through an output line 35. Since the fuel cell 10 comes to have a high temperature, a heat sink 32 is attached to a housing of the fuel cell 10. As will be described later, the fuel cell 10 is provided with a heater configured to locally heat the electrolyte membrane, and power is supplied to the heater from a compact battery 33. A controller 34 is configured to control valves such as the decompressor valve 23, the fuel sealing valve 27, and the compact battery 33. In FIG. 1, signal lines extending from the controller 34 to respective devices are omitted from depiction.

Figure 2:
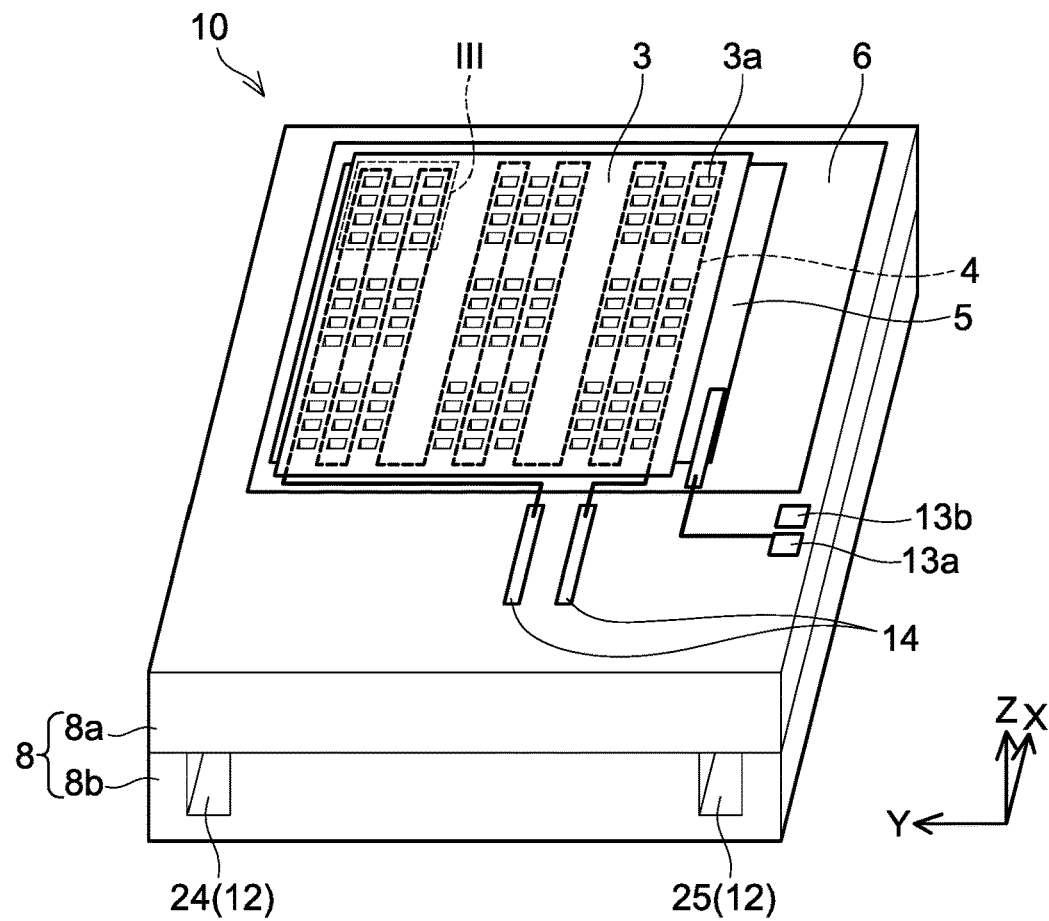
FIG. 2 is a perspective view of the fuel cell of the embodiment.

A perspective view of the fuel cell 10 is shown in FIG. 2. The fuel cell 10 is provided on a silicon substrate 8. The silicon substrate 8 is configured by adhering two substrates (upper substrate 8a and lower substrate 8b). Although not shown in FIG. 2 by being hidden, the upper substrate 8a is provided with a plurality of through holes. The through holes are provided by etching from a lower side of the upper substrate 8a. The lower substrate 8b is provided with a fuel passage 12 configured to guide fuel gas to the through holes in the upper substrate 8a. One end of the fuel passage 12 corresponds to the fuel supply inlet 24, and the other end corresponds to the discharge outlet 25. The lower substrate 8b functions as a cover to close lower sides of the through holes. An upper surface side in FIG. 2 is an air electrode side. A cover configured to guide the external air is attached to the air electrode side, however, a depiction of this cover is omitted in FIG. 2.

Although not shown in FIG. 2 by being hidden, the silicon substrate 8 is provided with a plurality of recesses. The recesses are constituted of the through holes provided in the upper substrate 8a and the lower substrate 8b closing bottoms of those through holes. The recesses will be described again later with reference to FIG. 3.

The recesses provided in the silicon substrate 8 are covered by a solid electrolyte membrane 6. A first electrode membrane 5 is provided on the electrolyte membrane 6. Although not shown in FIG. 2 by being hidden by the electrolyte membrane 6, a second electrode membrane is provided under the electrolyte membrane 6. In the fuel cell 10 of the present embodiment, the first electrode membrane 5 corresponds to an air electrode (cathode), and the second electrode membrane corresponds to a fuel electrode (anode).

Output electrodes 13a, 13b configured to take out power are provided on an upper surface of the silicon substrate 8. The output electrode 13a (cathode) is connected to the first electrode membrane 5 by a cable. Although not shown in FIG. 2 by being hidden, the output electrode 13b passes through inside of the silicon substrate 8 (upper substrate 8a), and is connected to the second electrode membrane located below the electrolyte membrane 6.

An insulating film 3 is provided on the first electrode membrane 5. The insulating film 3 is provided with a plurality of through holes 3a at positions facing the recesses of the silicon substrate 8. In FIG. 2, a reference sign 3a is given to only one through hole at the uppermost right, and the reference sign is omitted for the rest of the through holes.

A heater 4 is embedded inside the insulating film 3. The heater 4 is a high-resistance conductive wire that generates heat when it is electrically conducted. The heater 4 is embedded in the insulating film 3 so as to arranged to pass sides of the through holes 3a. A reference sign 14 is an input terminal of the heater 4, and the compact battery 33 shown in FIG. 1 is connected to this input terminal 14.

Figure 3:
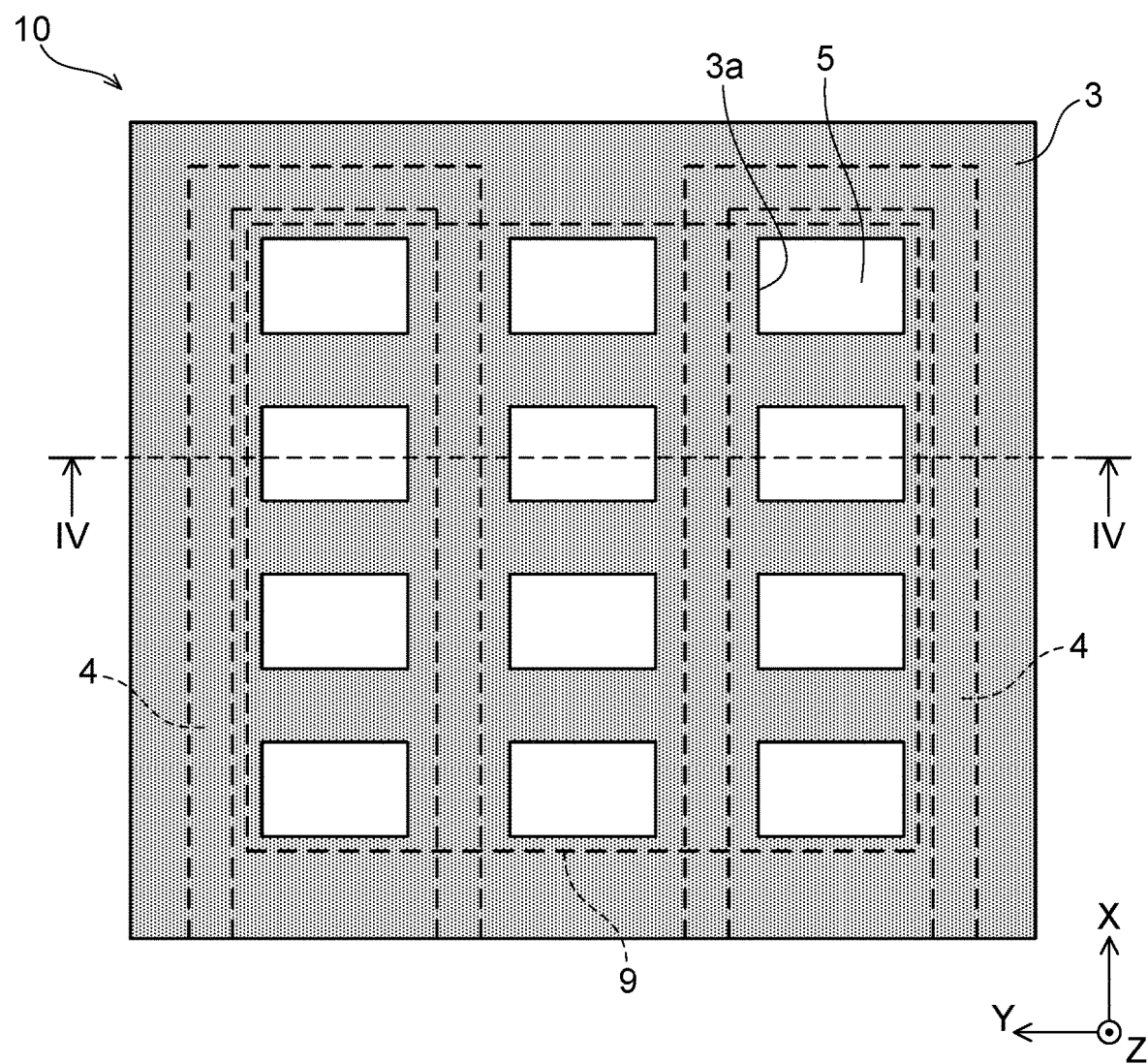
FIG. 3 is a plan view of a range indicated by a sign III in FIG. 2.
Figure 4:
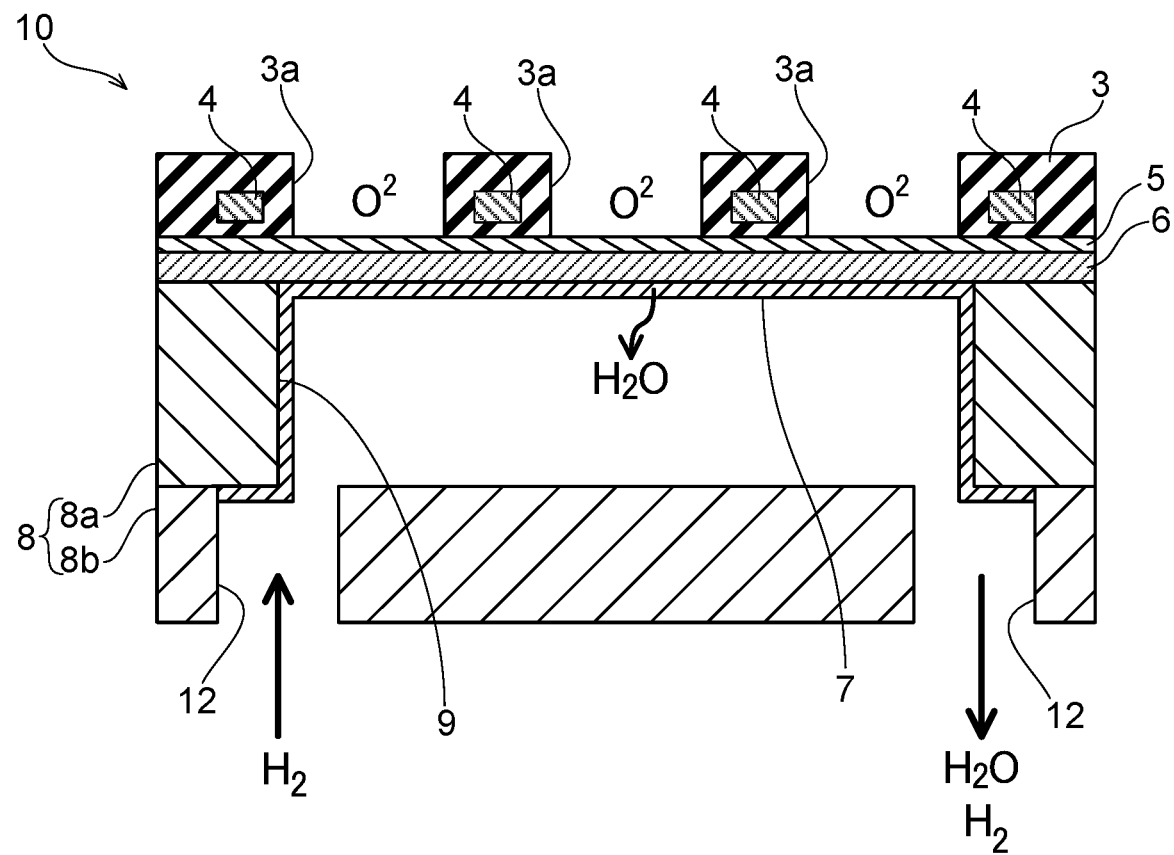
FIG. 4 is a cross-sectional view along a line IV-IV in FIG. 3.

A plan view of a range indicated by a broken line III in FIG. 2 is shown in FIG. 3. In FIG. 3, the insulating film 3 is colored gray for easier understanding. A cross sectional view of the fuel cell 10 along a line IV-IV in FIG. 3 is shown in FIG. 4. In FIG. 3, a broken line 9 shows one recess provided in the silicon substrate 8. In this embodiment, twelve through holes 3a are provided in the insulating film 3 to face an opening of one recess 9. In FIG. 3, the reference sign 3a is given to only one through hole at the uppermost right, and the reference sign is omitted for the rest of the through holes. Further, as aforementioned, the first electrode membrane 5 is interposed between the insulating film 3 and the electrolyte membrane 6 (see FIG. 2). In the plan view of FIG. 3, the first electrode membrane 5 can be seen inside the through holes 3a. In FIG. 3, the reference sign 5 is given to a part of the first electrode membrane that can be seen inside the through hole 3a at the uppermost right, and the reference sign is omitted for parts of the first electrode membrane that can be seen inside the other through holes 3a. The first electrode membrane 5 is in contact with the electrolyte membrane 6. Further, although not visible in FIG. 3, the second electrode membrane 7 is in contact with the electrolyte membrane 6 at an opposite side from the first electrode membrane 5.

Ranges in FIG. 2 where the plurality of through holes 3a was provided, other than the range indicated by the broken line III, have a same structure as that in FIGS. 3 and 4. That is, the substrate 8 is provided with the plurality of recesses 9, and the openings of the respective recesses 9 are covered by the electrolyte membrane 6. Further, the insulating film 3 covers the electrolyte membrane 6 on an opposite side from the recesses 9, and this insulating film 3 is provided with the plurality of through holes 3a in a range facing the recesses 9. The first electrode membrane 5 is in contact with the electrolyte membrane 6 inside each through hole 3a, and the second electrode membrane 7 is in contact with the electrolyte membrane 6 on the opposite side from the first electrode membrane 5. Hereinbelow, a combined membrane covering the openings of the recesses 9 (combined membrane constituted of the electrolyte membrane 6, the first electrode membrane 5, the second electrode membrane 7, and the 36 insulating film 3) may be referred to as a diaphragm.

As aforementioned, the insulating film 3 has the heater 4 embedded therein so as to extend alongside the through holes 3a. As shown in FIG. 3, the heater 4 has an elongate linear shape, and is arranged to interleave the rows of the plurality of through hole 3a from their both sides. The heater 4 heats a stack of the electrolyte membrane 6, the first electrode membrane 5, and the second electrode membrane 7 from a location in close proximity. A diameter of the recesses 9 (width of the recess 9 in FIG. 4) provided in the silicon substrate 8 is equal to or less than few millimeters at maximum, so a diameter of the through holes 3a of the insulating film 3 is less than 1 mm at maximum. The heater 4 extends through such a narrow range, and the heater 4 can heat the stack of the electrolyte membrane 6, the first electrode membrane 5, and the second electrode membrane 7 to a reactable temperature (e.g., a few hundred degrees Celsius) with a small amount of power.

As shown in FIG. 4, hydrogen gas (fuel gas) is supplied to each of the recesses 9 through the fuel passage 12 inside the silicon substrate 8. The hydrogen gas fills each recess 9 so as to make contact with the second electrode membrane 7. The stack of the electrolyte membrane 6, the first electrode membrane 5, and the second electrode membrane 7 is heated by the heater 4 to its reactable temperature. When oxygen ions pass through the electrolyte membrane 6 from a first electrode membrane 5 (air electrode) side and reaches a second electrode membrane 7 (fuel electrode) side, hydrogen and carbon monoxide react with oxygen ions to generate water and carbon dioxide, and electrons discharged thereupon are outputted as electric power.

When oxygen-hydrogen reaction begins, this reaction continues by heat generation. Upon when the fuel cell 10 is activated, the stack of the electrolyte membrane 6, the first electrode membrane 5, and the second electrode membrane 7 is heated by the heater 4. As aforementioned, since the heater 4 can heat the stack by being right next to the stack, so the heater 4 can heat the stack quickly with a small amount of energy.

The insulating film 3 includes the plurality of through holes 3a in ranges corresponding to the recesses 9 of the silicon substrate 8. In other words, the insulating film 3 has a lattice-like profile in a range corresponding to the recesses 9. The lattice-like insulating film 3 is bonded to the thin electrolyte membrane 6, and it also serves to enhance strength of the electrolyte membrane 6 covering the openings of the recesses 9.

A manufacturing method of the fuel cell 10 of FIG. 4, and materials of the electrodes and the like will be described with reference to FIGS. 5A to 5I. The fuel cell 10 is manufactured by using a micro-fabrication (MEMS) technique such as etching. The fuel cell 10 may be termed a MEMS fuel cell. The description of a manufacturing method of the lower substrate 8b shown in FIGS. 2 and 4 will be omitted.

Figure 5A:
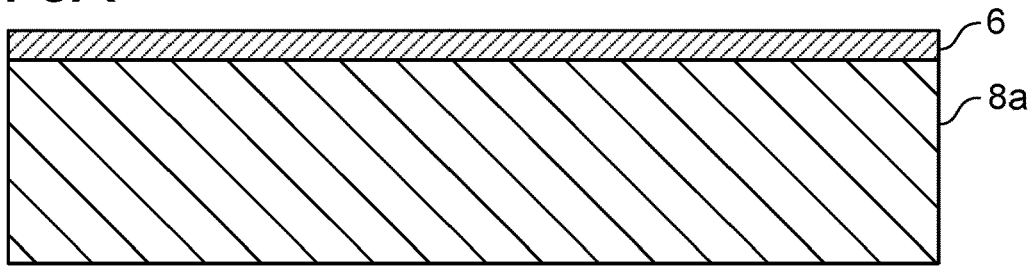
FIG. 5A is a diagram (1) explaining a manufacturing method of the fuel cell.

Firstly, the thin film-like electrolyte membrane 6 is deposited on an upper surface (first main surface) of the silicon substrate (upper substrate 8a) (FIG. 5A). The electrolyte membrane 6 may be a thin film of lanthanum silicate oxyapatite (LSO, lanthanum silicate), yttria-stabilized zirconia (YSZ), lanthanum gallate ($LaGaO_3$), and the like. A thickness of the electrolyte membrane 6 is about 10 (nm) to 2000 (nm).

Figure 5B:
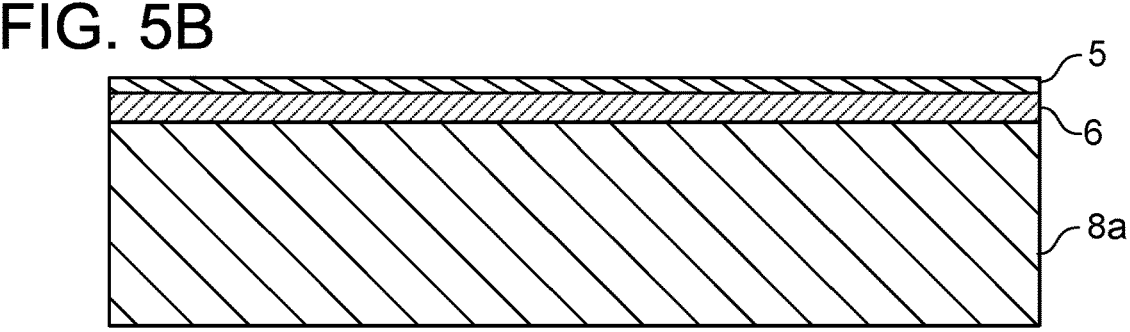
FIG. 5B is a diagram (2) explaining the manufacturing method of the fuel cell.

The first electrode membrane 5 (air electrode) is deposited on the electrolyte membrane 6 (FIG. 5B). The first electrode membrane 5 is constituted of metal having catalyst and collector effects, and is a metal thin film of platinum (Pt), nickel alloy (Cr/Ni), platinum alloy (Ni/Pt, Ti/Pt, Cr/Pt), and the like. Alternatively, the first electrode membrane 5 may be a conductive film (for example, a conductive ceramic film) having the aforementioned metal particles supported thereon. The first electrode membrane 5 has a porous structure. Due to this, the gas (oxygen) can pass through this electrode membrane to reach the electrolyte membrane 6, and can become ionized by catalyst reaction with the metal film on a surface of the electrolyte membrane 6, and ions generated thereby pass through the electrolyte membrane 6. The first electrode membrane 5 (air electrode) may be a conductive oxide semiconductor film.

Figure 5C:
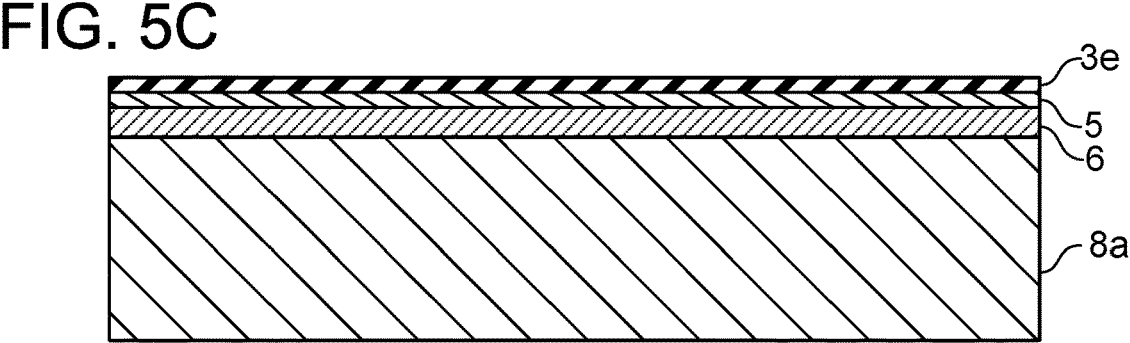
FIG. 5C is a diagram (3) explaining the manufacturing method of the fuel cell.

Next, an insulating film 3e is deposited on the first electrode membrane 5 (FIG. 5C). Here, the insulating film 3e is deposited with a smaller thickness than the insulating film 3 in the completed fuel cell 10. As a material of the insulating film 3e (insulating film 3), a silicon nitride film, a silicon oxide film, or a stack structure thereof is preferable.

In order to ensure strength of the diaphragm (combined film of the electrolyte membrane 6, the first electrode membrane 5, the second electrode membrane 7, and the insulating film 3), the insulating film 3 is preferably deposited under a state of having tensile stress being applied.

Figure 5D:
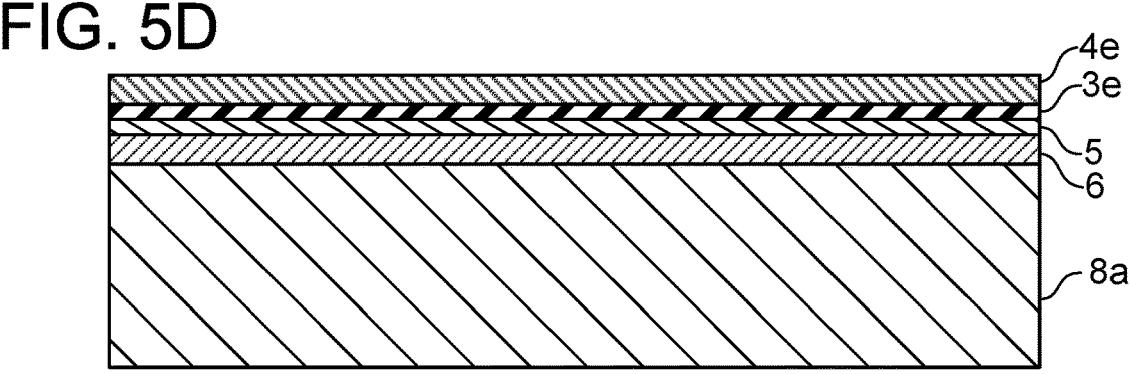
FIG. 5D is a diagram (4) explaining the manufacturing method of the fuel cell.
Figure 5E:
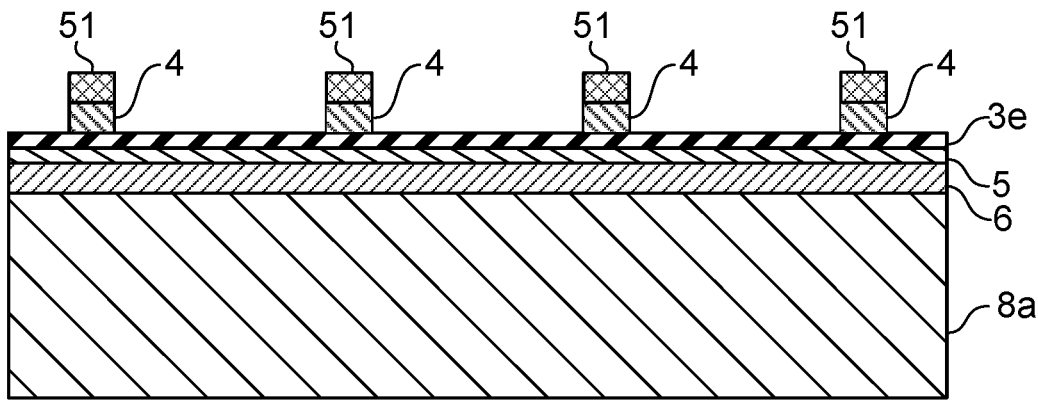
FIG. 5E is a diagram (5) explaining the manufacturing method of the fuel cell.

Next, a conductive film 4e, which is to be a base component of the heater 4, is deposited to cover the insulating film 3e (FIG. 5D). Then, a resist mask 51 is formed on a range that should remain to constitute the heater 4, and a range of the conductive film 4e other than the range covered by the resist mask 51 is removed by dry etching or wet etching (FIG. 5E). A thickness of the heater 4 is about 10 (nm) to 2000 (nm). As a material of the heater 4, for example, a thin film of platinum (Pt), titanium (Ti), a stacked film of titanium (Ti) and titanium nitride (TIN), nickel chrome (NiCr), or silicon is preferable.

Figure 5F:
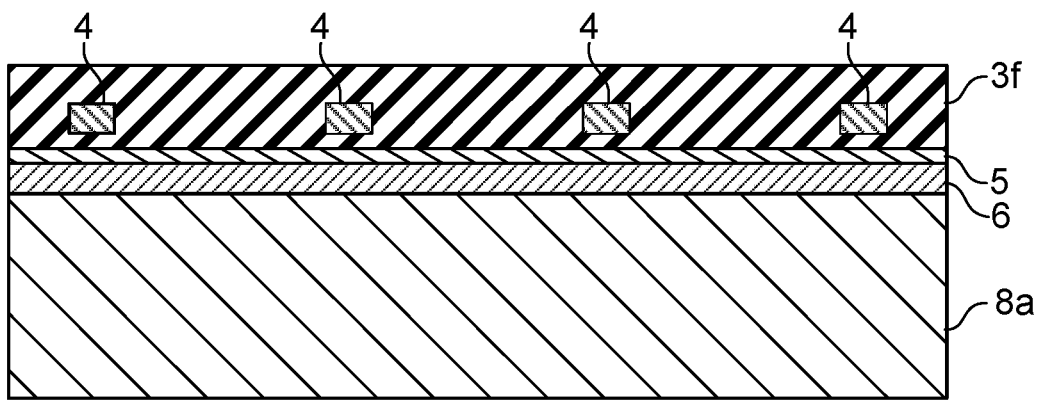
FIG. 5F is a diagram (6) explaining the manufacturing method of the fuel cell.

Next, an insulating film is additionally deposited to cover the heater 4 (FIG. 5F). This insulating film is integrated with the insulating film 3e, which was deposited earlier below the heater 4, and forms an insulating film 3f. The insulating film 3f in this step is preferably deposited under the state of having the tensile stress being applied as a whole, so as to support the strength of the diaphragm covering the recesses 9.

Figure 5G:
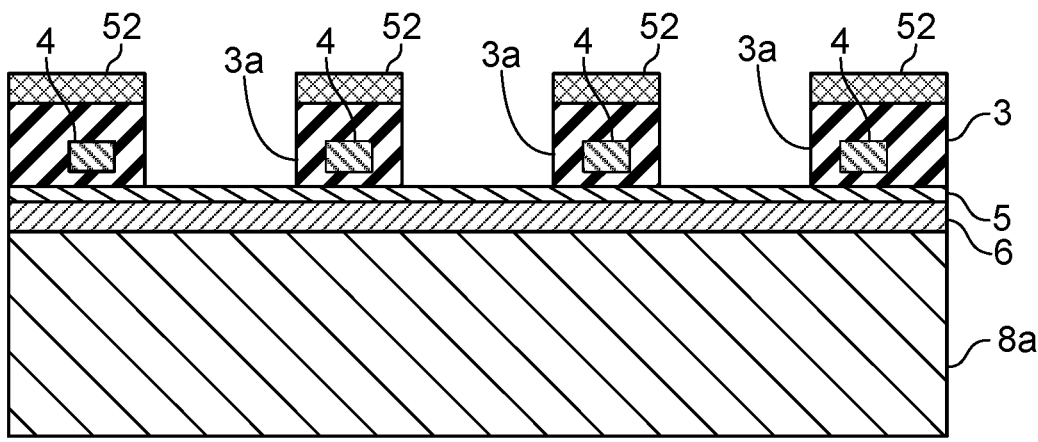
FIG. 5G is a diagram (7) explaining the manufacturing method of the fuel cell.

Next, a resist mask 52 is formed except for ranges where the through holes 3a are to be formed, and parts of the insulating film 3f are removed by dry etching or wet etching to form the through holes 3a (FIG. 5G).

Figure 5H:
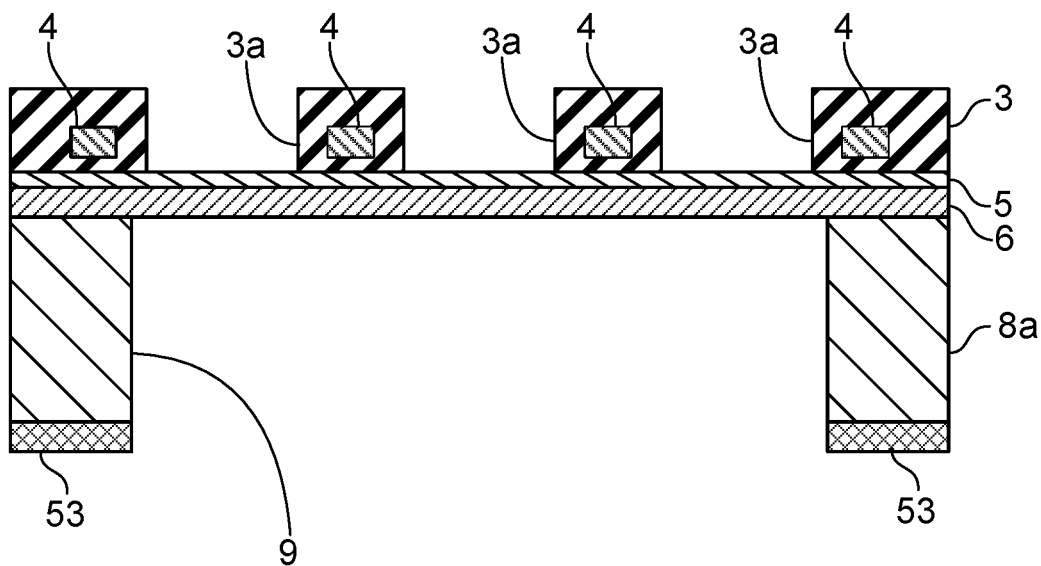
FIG. 5H is a diagram (8) explaining the manufacturing method of the fuel cell.

Next, dry etching or wet etching is performed from an opposite surface (second main surface) side of the upper substrate 8a to form the recesses 9. A resist mask 53 is formed on the opposite surface of the upper substrate 8a except for ranges where the recesses 9 are to be formed, and the recesses 9 are formed by the dry etching or the wet etching (FIG. 5H).

Figure 5I:
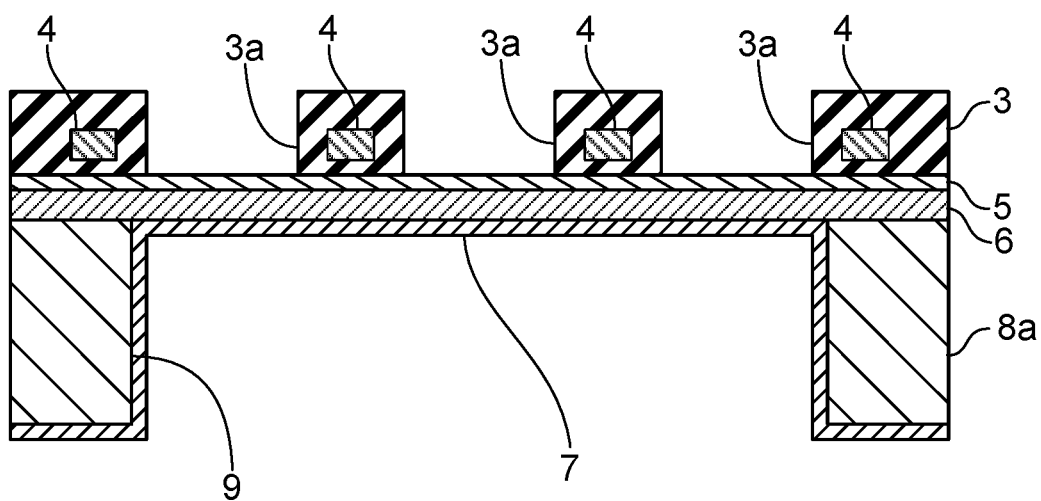
FIG. 5I is a diagram (9) explaining the manufacturing method of the fuel cell.

Then, the second electrode membrane 7 (fuel electrode) is deposited on a rear side of the upper substrate 8a (second main surface side) (FIG. 5I). The second electrode membrane 7 is formed in the recesses 9 as well, that is, on the surface of the electrolyte membrane 6 facing the recesses 9. The second electrode membrane 7 is configured of metal having catalyst and collector effects, and is a metal thin film of platinum (Pt), nickel alloy (Cr/Ni), platinum alloy (Ni/Pt, Ti/Pt, Cr/Pt), and the like. Alternatively, the second electrode membrane 7 may be a conductive film (for example, a conductive ceramic film) having the aforementioned metal particles supported thereon. The second electrode membrane 7 also has the porous structure.

Hereinbelow, variants of the fuel cell 10 will be described. In the description below, the description of the lower substrate 8b shown in FIGS. 2 and 4 will be omitted.

Figure 6:
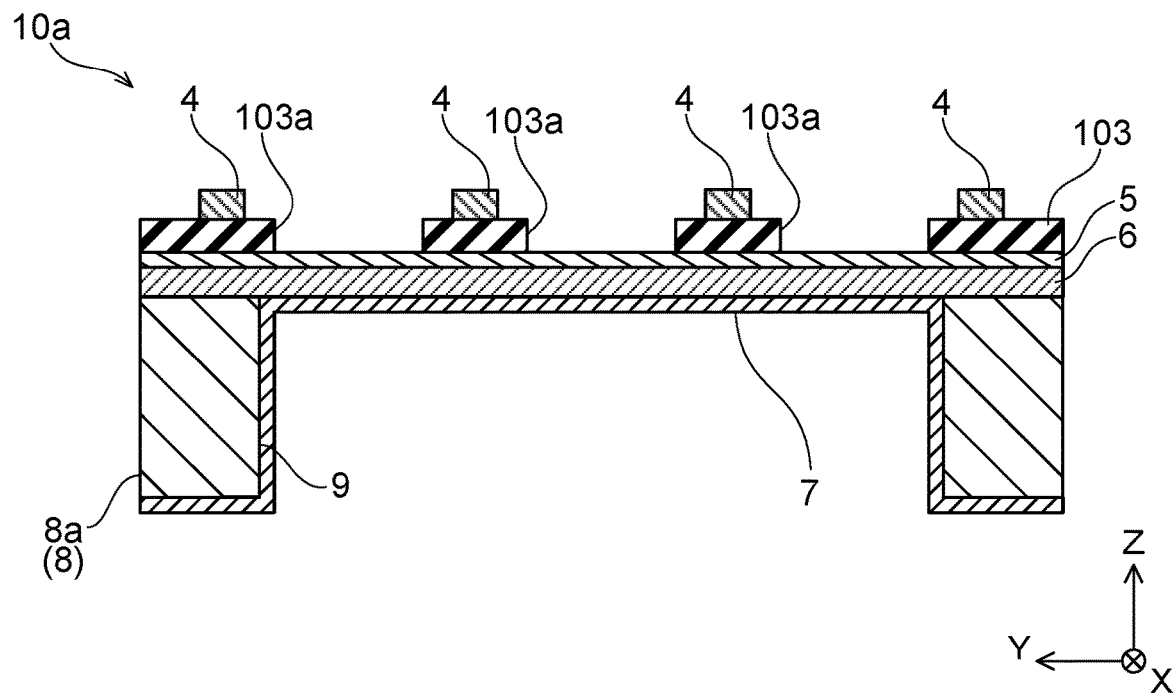
FIG. 6 is a cross-sectional view of a fuel cell of a first variant.

(First Variant) A fuel cell 10a of a first variant will be described. FIG. 6 is a cross sectional view of the fuel cell 10a of the first variant. In the aforementioned fuel cell 10, the heater 4 is embedded in the insulating film 3. In the fuel cell 10a of this variant, the heater 4 is arranged on an insulating film 103. The heater 4, which comes to have a high temperature, is preferably embedded in the insulating film 3 as shown in FIG. 4 in terms of its safety, however, it may be arranged on the insulating film 103. Further, by making the insulating film 3 thick enough to embed the heater 4, the strength of the insulating film 3 serving to protect the electrolyte membrane 6 is enhanced. Reference signs 103a in FIG. 6 indicate a plurality of through holes provided in the insulating film 103.

Figure 7:
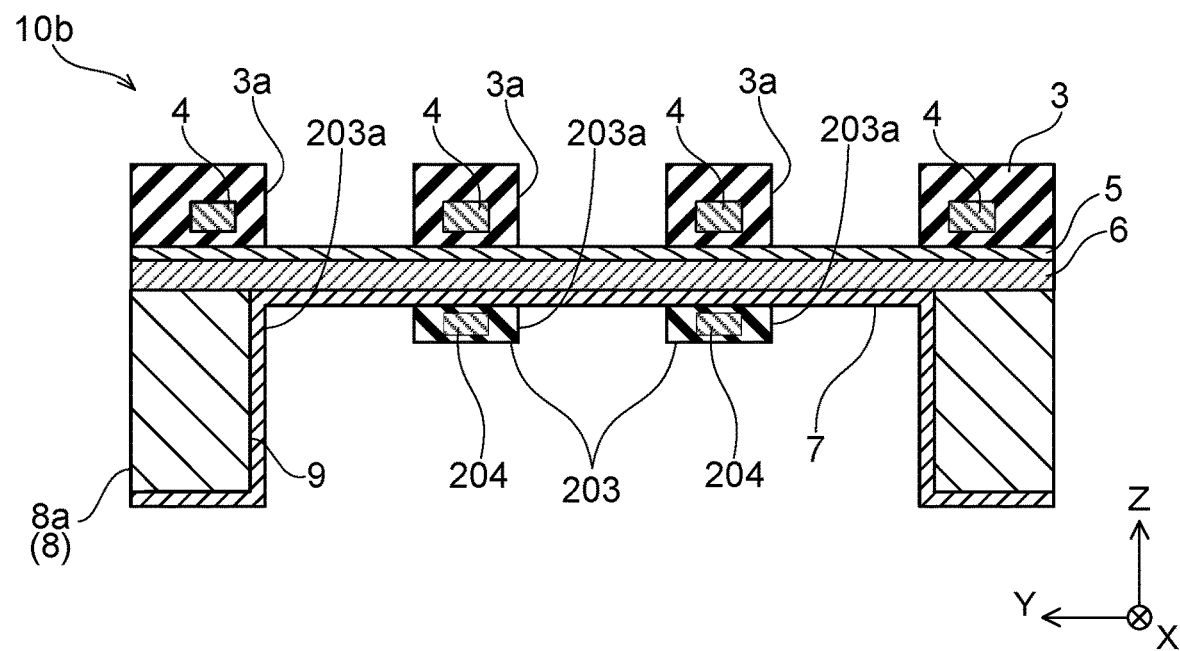
FIG. 7 is a cross-sectional view of a fuel cell of a second variant.

(Second Variant) A fuel cell 10b of a second variant will be described. FIG. 7 is a cross sectional view of the fuel cell 10b of the second variant. In the aforementioned fuel cell 10, the insulating film 3 covers the electrolyte membrane 6 on the opposite side from the recesses 9 of the substrate 8, and the heater 4 is embedded in the insulating film 3. In the fuel cell 10b of the second variant, in addition to the insulating film 3 and the heater 4, another insulating film 203 covers the electrolyte membrane 6 on a recess 9 side. This other insulating film 203 has through holes 203a provided therein to face the through holes 3a of the insulating film 3. Further, the insulating film 203 has another heater 204 embedded therein adjacent to the through holes 203a. In this variant, the two heaters 4, 204 heat the electrolyte membrane 6 from its both sides, so the electrolyte membrane 6 can be heated even faster. Further, the insulating films 3, 203 in contact with the both surfaces of the electrolyte membrane 6 protect the electrolyte membrane 6 with more enhanced protection.

Figure 8:
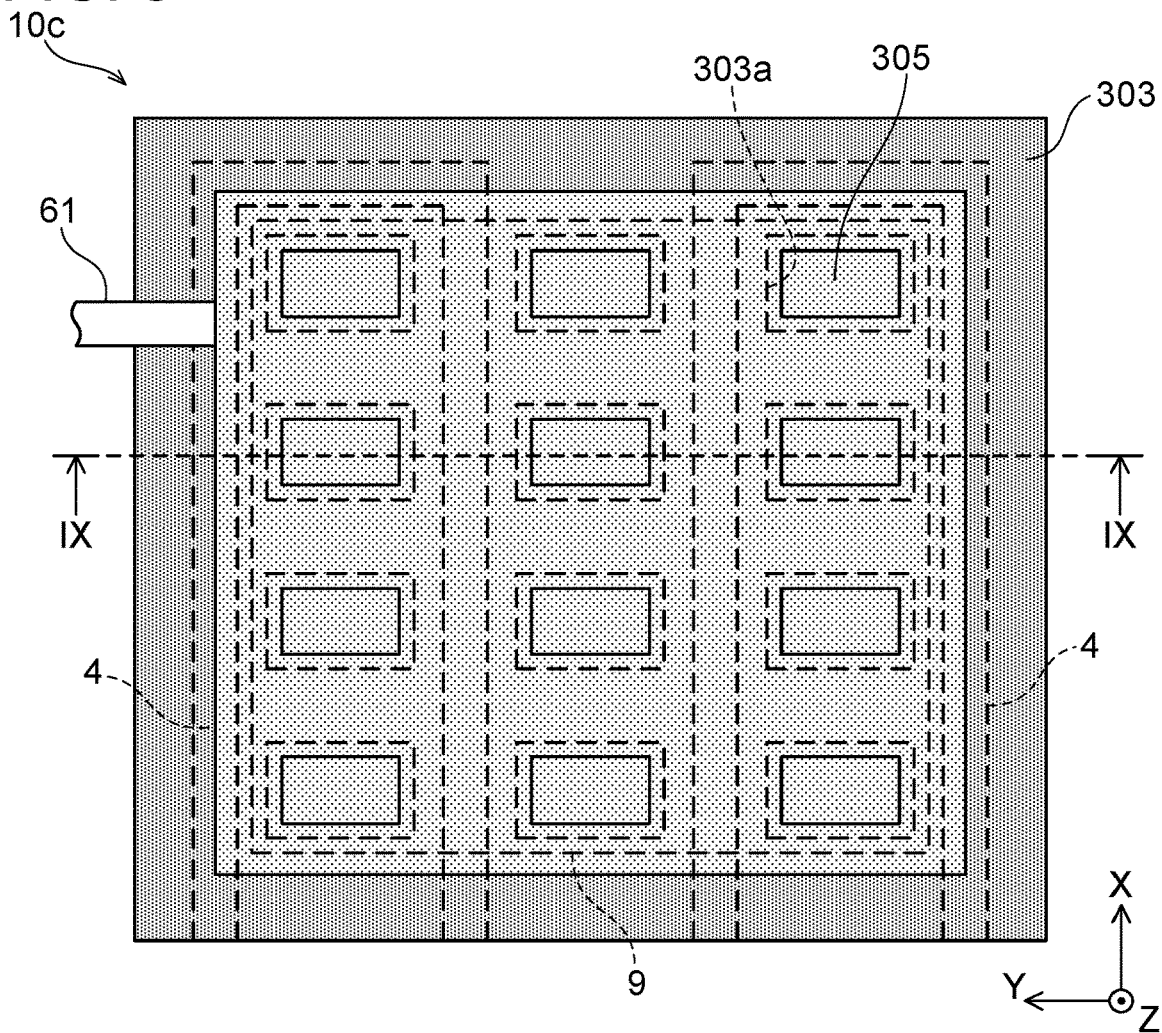
FIG. 8 is a plan view of a fuel cell of a third variant.
Figure 9:
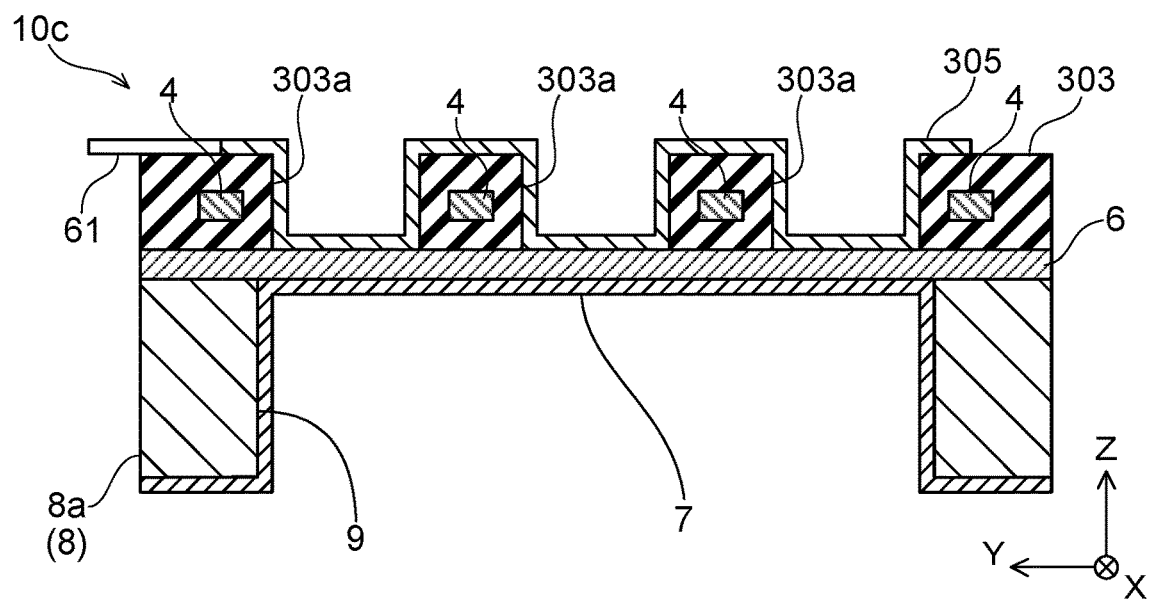
FIG. 9 is a cross-sectional view along a line IX-IX in FIG. 8.

(Third Variant) A fuel cell 10c of a third variant will be described. FIG. 8 is a partial plan view of the fuel cell 10c of the third variant. FIG. 9 is a cross sectional view along a line IX-IX in FIG. 7. In the aforementioned fuel cell 10, the first electrode membrane 5 is deposited between the electrolyte membrane 6 and the insulating film 3. In the fuel cell 10c of the third variant, an insulating film 303 including through holes 303a is deposited on the electrolyte membrane 6, and first electrode membranes 305 are further deposited thereon. In FIG. 8, a range colored light-gray shows one first electrode membrane 305. The first electrode membranes 305 are in contact with the electrolyte membrane 6 inside the through holes 303a, similar to the fuel cell 10 of the above embodiment. The first electrode membranes 305 further cover inner side surfaces of the through holes 303a and an upper surface of the insulating film 303.

Further, the first electrode membranes 305 each have a size that is about a same size as the recess 9 in a plan view of the substrate 8. Each first electrode membrane 305 is connected to other first electrode membranes covering its adjacent recesses by narrow connection conductor wires 61. By limiting a range of each first electrode membrane 305 to be within a range inside its corresponding recess 9, heat to be transferred from the first electrode membranes 305 can be suppressed. As a result, the electrolyte membrane 6 can be heated efficiently.

Figure 10A:
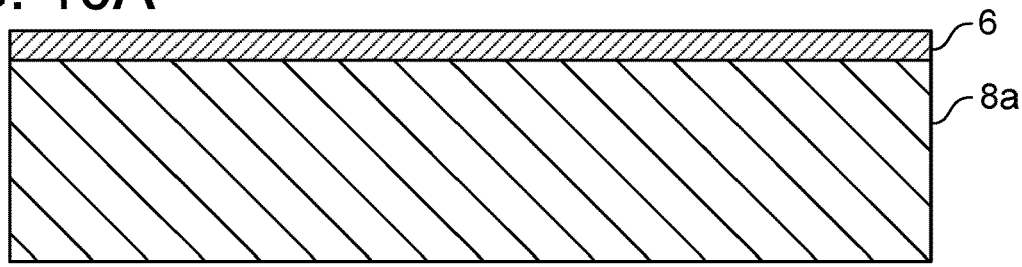
FIG. 10A is a diagram (1) explaining a manufacturing method of a fuel cell of a third embodiment.
Figure 10B:
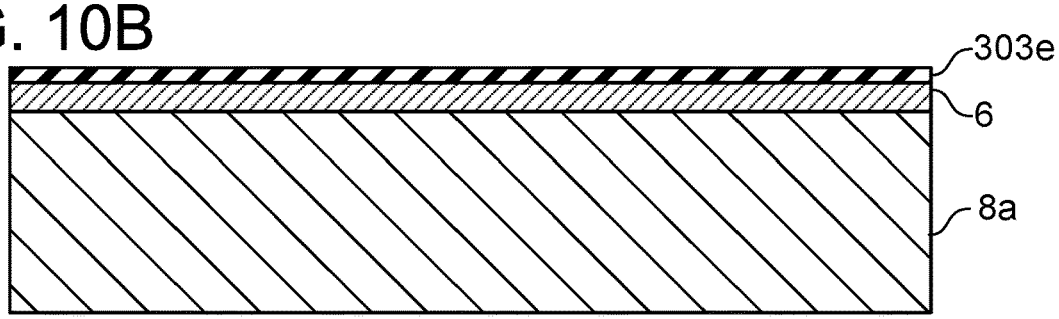
FIG. 10B is a diagram (2) explaining the manufacturing method of the fuel cell of the third embodiment.
Figure 10C:
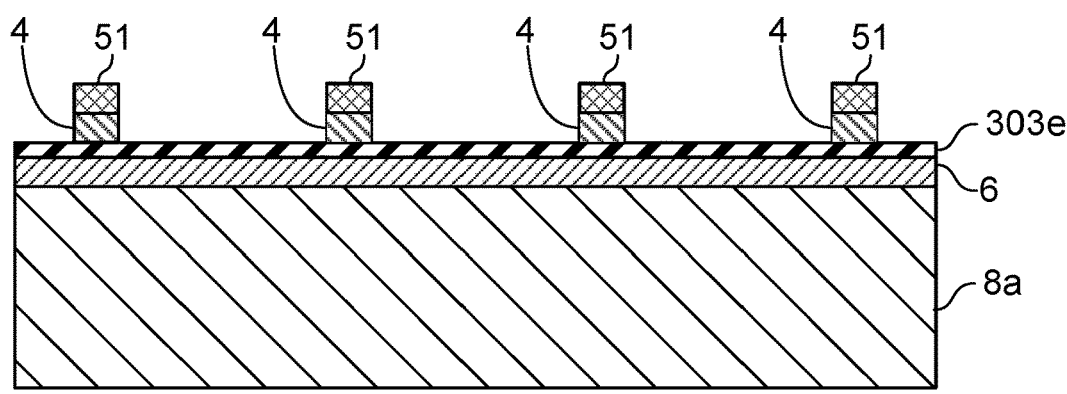
FIG. 10C is a diagram (3) explaining the manufacturing method of the fuel cell of the third embodiment.
Figure 10D:
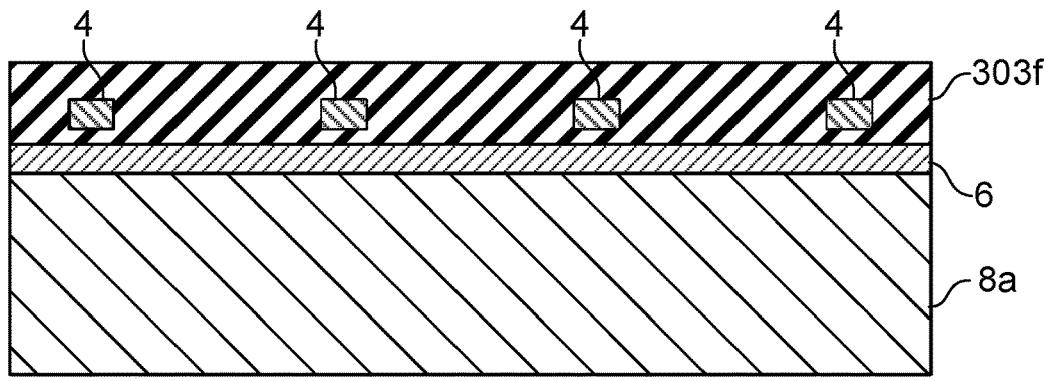
FIG. 10D is a diagram (4) explaining the manufacturing method of the fuel cell of the third embodiment.

A manufacturing method of the fuel cell 10c of a third embodiment will be described with reference to FIGS. 10A to 10H. Firstly, the thin film-like electrolyte membrane 6 is deposited on the upper surface (first main surface) of the silicon substrate (upper substrate 8a) (FIG. 10A). Next, an insulating film 303e is deposited on the electrolyte membrane 6 (FIG. 10B). Here, the insulating film 303e is deposited with a smaller thickness than an insulating film 303 in the completed fuel cell 10c. Next, the conductive film, which is to be the base component of the heater 4, is deposited to cover the insulating film 303e. Then, the resist mask 51 is formed on the range that should remain to constitute the heater 4, and the range of the conductive film other than the range covered by the resist mask 51 is removed by dry etching or wet etching to form the heater 4 (FIG. 10C). Then, an insulating film is additionally deposited to cover the heater 4 (FIG. 10D). This insulating film is integrated with the insulating film 303e, which was deposited earlier under the heater 4, and forms an insulating film 303f.

Figure 10E:
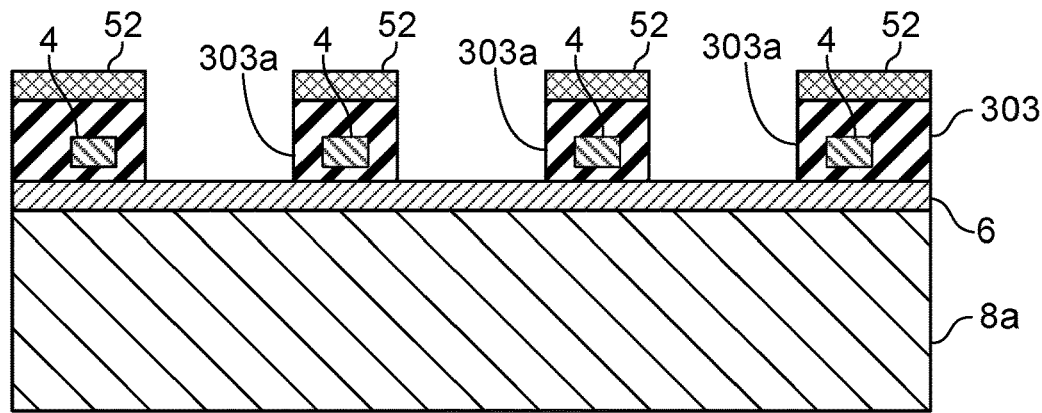
FIG. 10E is a diagram (5) explaining the manufacturing method of the fuel cell of the third embodiment.
Figure 10F:
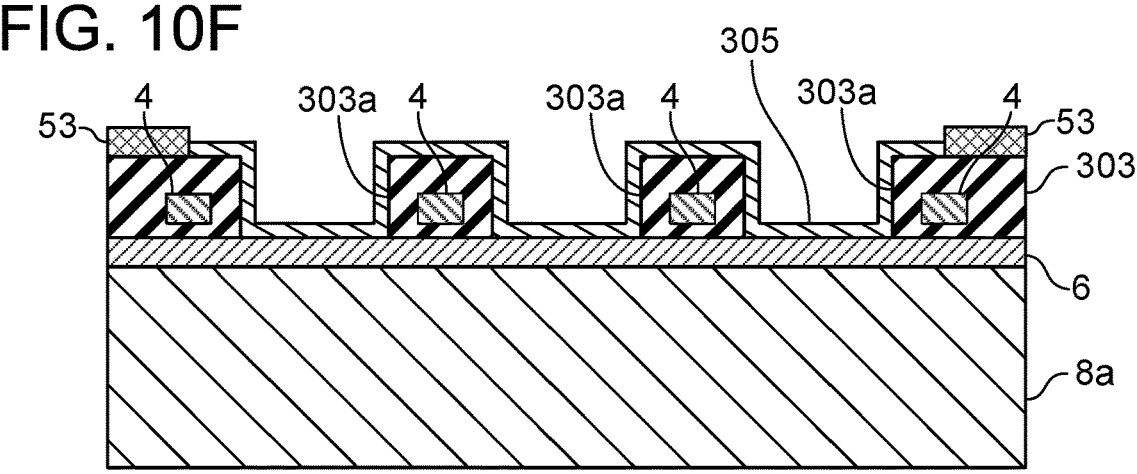
FIG. 10F is a diagram (6) explaining the manufacturing method of the fuel cell of the third embodiment.

Next, the resist mask 52 is formed except for ranges where the through holes 303a are to be formed, and parts of the insulating film 303f are removed by dry etching or wet etching to form the through holes 303a (FIG. 10E). Then, a first electrode membrane 305 (air electrode) is deposited on the insulating film 303. At this stage, a resist mask 53 is formed on a range that does not need the first electrode membrane 305. The first electrode membrane 305 is deposited on the electrolyte membrane 6 within the through holes 303a (FIG. 10F).

Figure 10G:
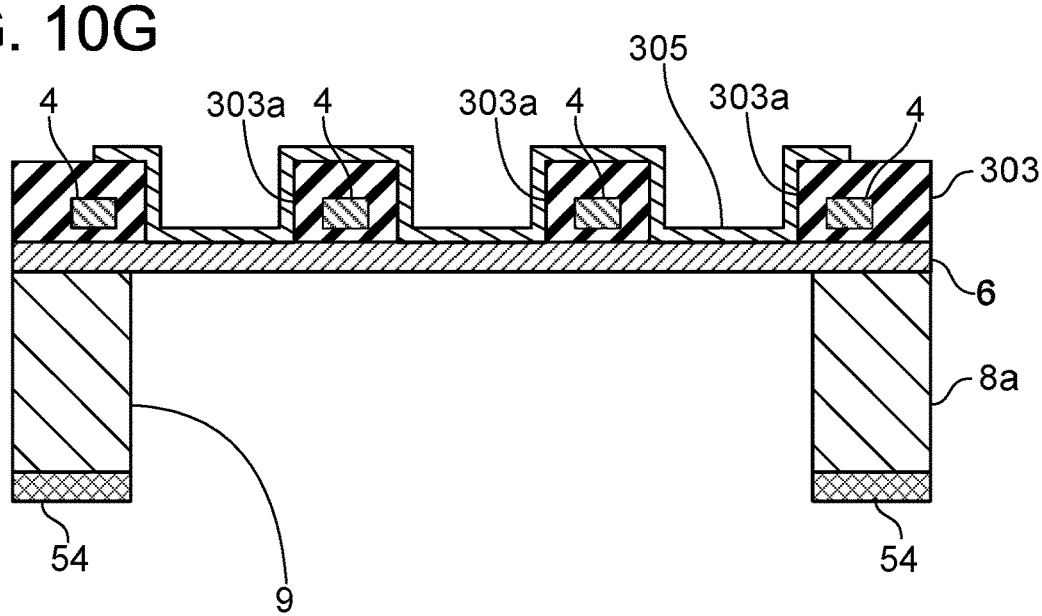
FIG. 10G is a diagram (7) explaining the manufacturing method of the fuel cell of the third embodiment.
Figure 10H:
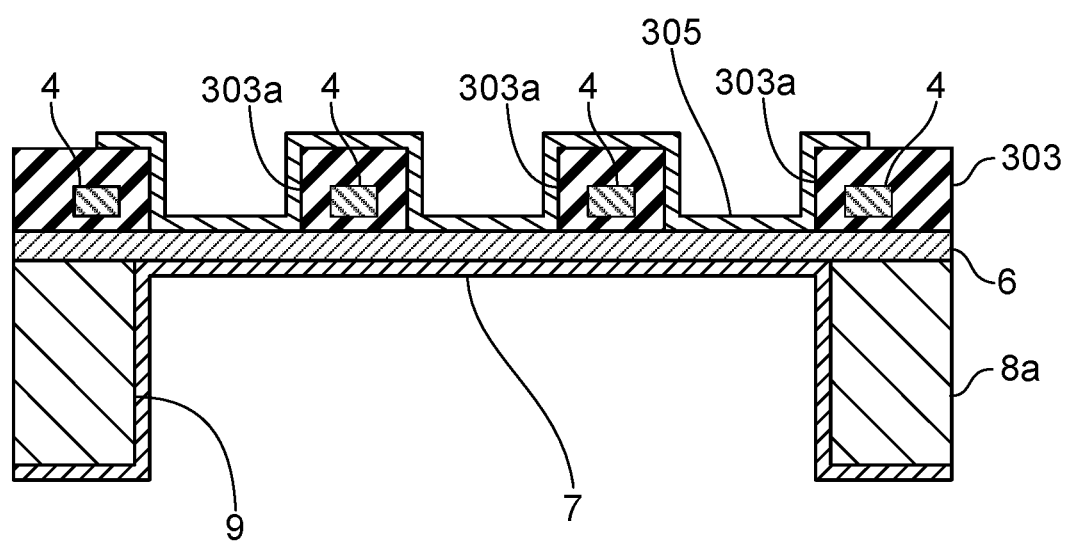
FIG. 10H is a diagram (8) explaining the manufacturing method of the fuel cell of the third embodiment.

Next, dry etching or wet etching is performed from the opposite surface (second main surface) side of the upper substrate 8a to form the recesses 9. A resist mask 54 is formed on the opposite surface of the upper substrate 8a except for the ranges where the recesses 9 are to be formed, and the recesses 9 are formed by the dry etching or the wet etching (FIG. 10G). Then, the second electrode membrane 7 (fuel electrode) is deposited on the rear side of the upper substrate 8a (second main surface side) (FIG. 10H). The second electrode membrane 7 is formed in the recesses 9 as well, that is, on the surface of the electrolyte membrane 6 facing the recesses 9.

Figure 11:
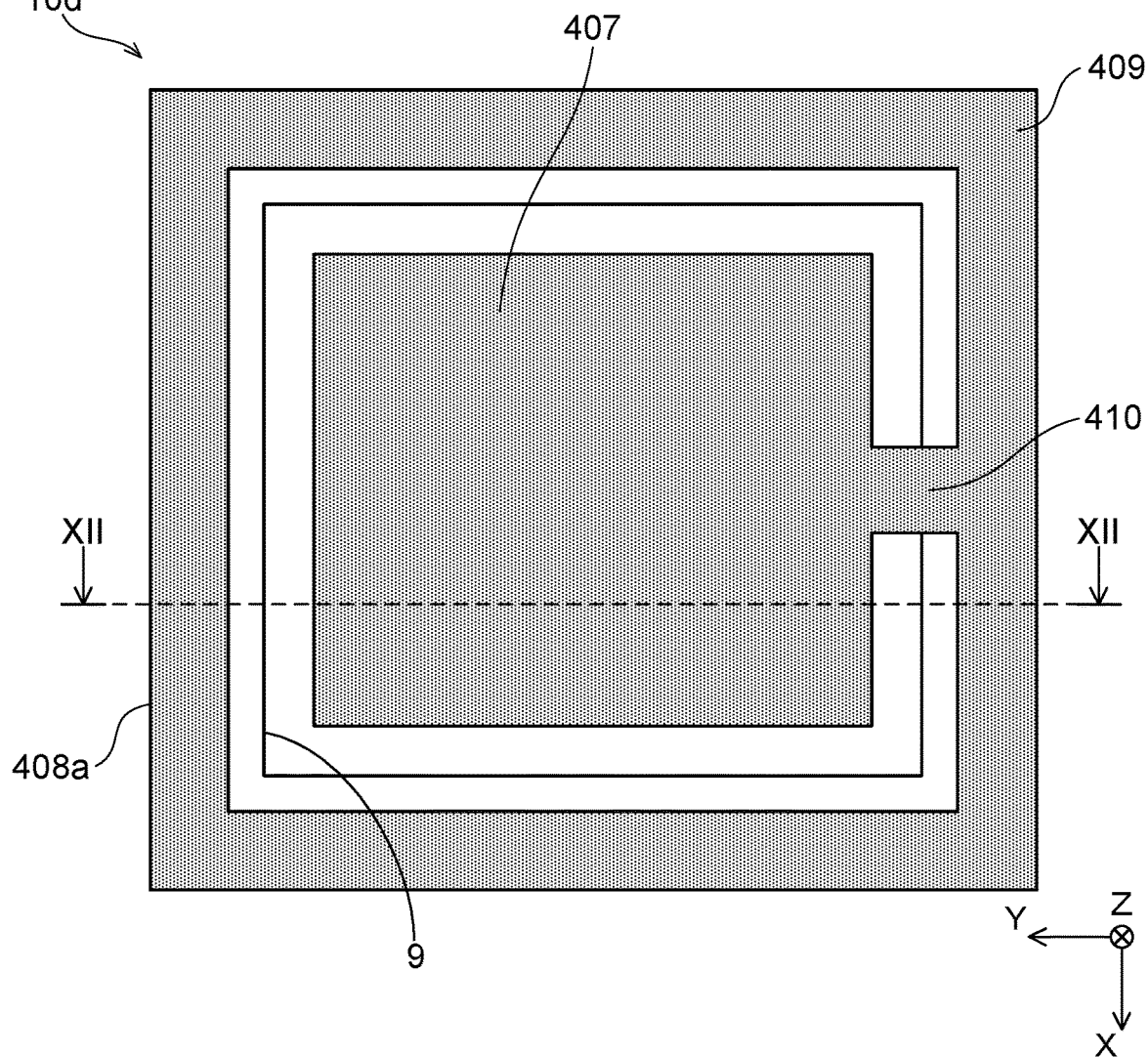
FIG. 11 is a plan view of a fuel cell of a fourth variant.
Figure 12:
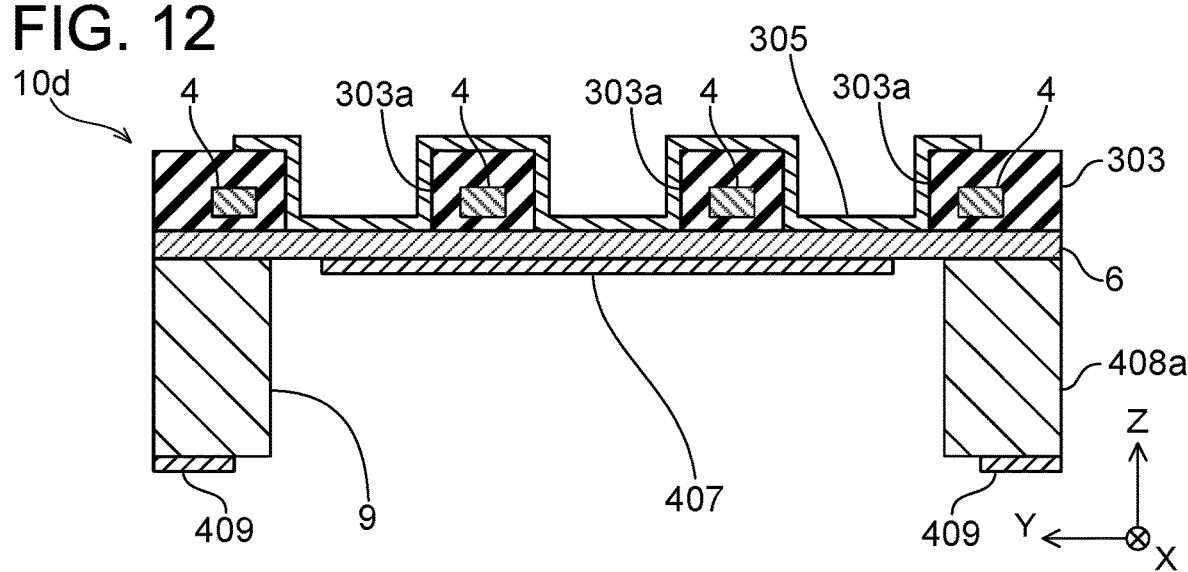
FIG. 12 is a cross-sectional view along a line XII-XII in FIG. 11.

(Fourth Variant) A fuel cell 10d of a fourth variant will be described with reference to FIGS. 11 and 12. FIG. 11 is a partial plan view that sees the fuel cell 10d from the rear surface side (second main surface side). FIG. 12 is a cross sectional view along a line XII-XII in FIG. 11. In the fuel cell 10d of the fourth variant, the structure on the first main surface side is identical to that of the fuel cell 10c of the third variant. Thus, the structure above the electrolyte membrane 6 in FIG. 12 is same as that in FIG. 9, and uses same reference signs as those in FIG. 9. In the fuel cell 10d, a second electrode membrane 407 is provided in a portion limited to an inner side of the recess 9. Another conductive membrane 409 is provided on an outer side of the recess 9, that is, on a second main surface of an upper substrate 408a, and this other conductive membrane 409 and the second electrode membrane 407 are electrically connected by a narrow coupling conductive membrane 410. In other recesses as well, there are other second electrode membranes 407 in portions limited to within their corresponding recesses. These second electrode membranes 407 are also electrically connected to the other conductive membrane 409 by narrow coupling conductive membranes 410. By limiting the second electrode membranes to be on the inner side of the recesses, heat transferred through the second electrode membranes can be suppressed.

(Other Embodiments) In the above embodiments, the recesses 9 provided in the substrate 8 are rectangular in their plan view, however, a plan-view profile of the recesses 9 is not limited to rectangles. The profile of the recesses 9 may be circular, oval, or polygonal. Similarly, a plan-view profile of the through holes 3a provided in the insulating film 3 is not limited to rectangles. The plan-view profile of the through hole 3a may be circular, oval, or polygonal.

The heater is preferably embedded in the insulating film, however, no limitation is made hereto, and it may be exposed on the insulating film. The insulating film and the heater are preferably provided on the opposite side from the recesses of the electrolyte membrane, however, they may be provided on the same side as the recesses of the electrolyte membrane.

In the embodiments, the first electrode membrane 5 in contact with the electrolyte membrane 6 on the opposite side from the recesses 9 is the air electrode, and the second electrode membrane 7 in contact with the electrolyte membrane 6 on the recess 9 side is the fuel electrode. Opposite from this, a first electrode membrane in contact with the electrolyte membrane 6 on the opposite side from recesses may be the fuel electrode, and a second electrode membrane in contact with the electrolyte membrane 6 on a recess side may be the air electrode.

Some of the features described in the embodiments will be listed below.

The heater is preferably embedded in the insulating film at a position adjacent to the through hole. Safety increases by embedding the heater, which comes to have a high temperature, in the insulating film without exposing it. Further, by making the insulating film thick enough to embed the heater, the strength of the insulating film is thereby increased, and the electrolyte membrane can further be protected.

The insulating film may cover the electrolyte membrane opposite to the recess. When the fuel cell is to be manufactured using the MEMS technique, manufacture thereof is easier by forming the electrolyte membrane to cover the recess of the substrate, and forming the insulating film thereon (that is, on the surface opposite to the recess of the electrolyte membrane).

The insulating film may include a plurality of through holes, and the first electrode may be provided so as to face the electrolyte membrane in each of the plurality of through holes. The strength of the insulating film reinforcing the electrolyte membrane is increased by being provided with the plurality of through holes rather than one large through hole, and reliability of the fuel cell is increased. Further, in this case, the heater may be arranged to pass both sides of a row of the plurality of through holes. The reaction region corresponding to bottoms of the through holes can be heated quickly from both sides of the through holes.

As aforementioned, the fuel cell disclosed herein is preferably manufactured by the MEMS technique. By using the MEMS micro-fabrication technique, for example, the maximum width of the through holes provided in the insulating film (when the through holes are circular, a diameter thereof corresponds to the maximum width, and when the through holes are rectangular, a long width thereof corresponds to the maximum width) comes to have a size of less than 1 (mm). When the fuel cell disclosed herein is manufactured by the MEMS technique, such a fuel cell may be termed a "MEMS fuel cell".

Figure 13:
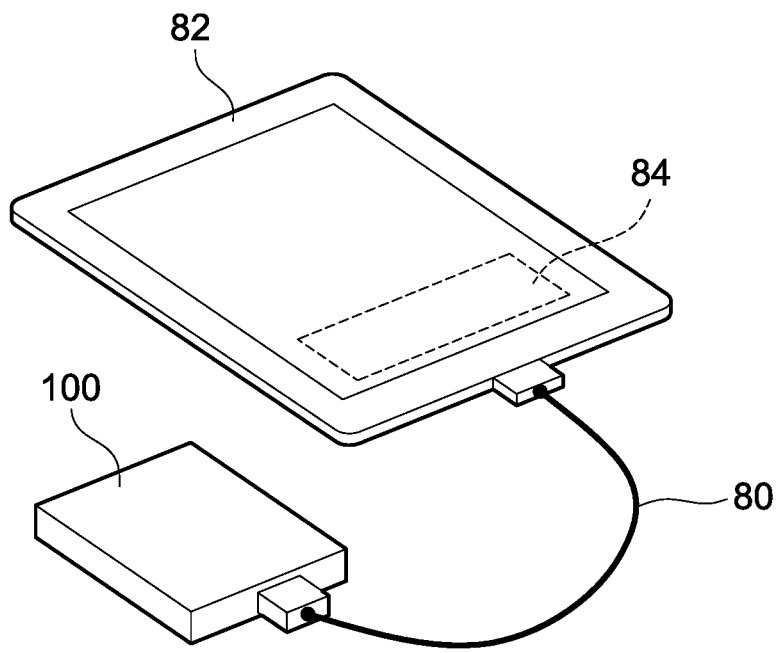
FIG. 13 is a diagram showing an example of use of a fuel cell system of an embodiment.

(Purposes of Fuel Cell System) The fuel cell system 100 may be used in various purposes. According to the present disclosure, the fuel cell system can be made compact. Further, since the portion to be heated to a temperature required for power generation is a diaphragm with a small heat capacity, an on-time required for the power generation becomes shortened, and on-off switching can be repeated in short period of time. Thus, for example, as shown in FIG. 13, the fuel cell system 100 can be used as a charger connectable to a mobile device 82 such as a tablet via a charger cable 80. In this case, a battery 84 provided in the mobile device 82, a power load of the mobile device 82, and the fuel cell system 100 can be connected electrically in parallel, and they may be configured capable of switching a power supply destination by a switch to allow the battery 84 to be charged by the fuel cell system 100, and also to allow power supply to the power load of the mobile device 82.

Figure 14:
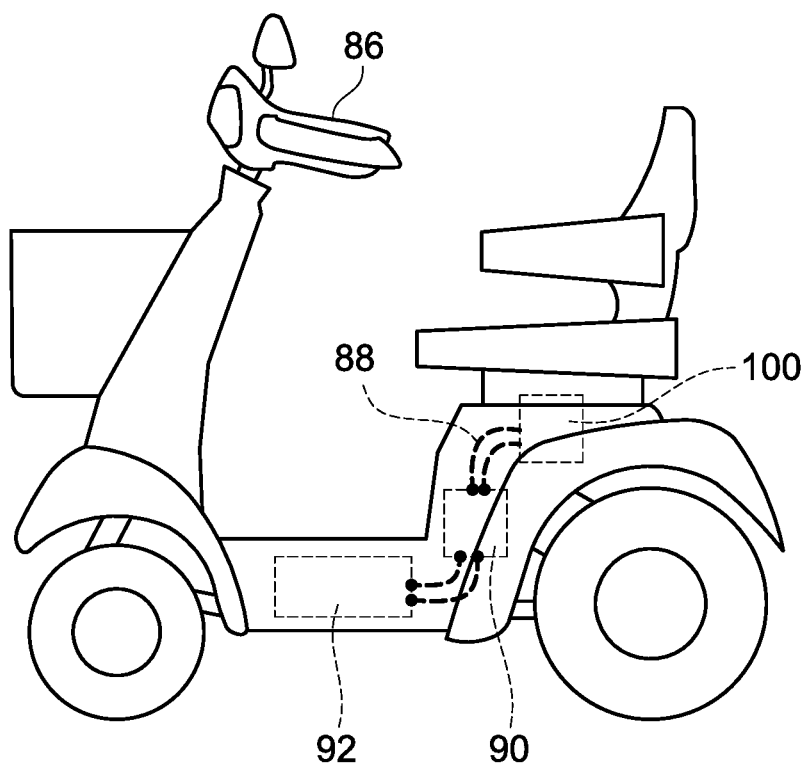
FIG. 14 is a diagram showing another example of use of a fuel cell system of an embodiment.

Alternatively, as shown in FIG. 14, the fuel cell system 100 may be used as a sub battery mounted on a compact mobility 86 (for example, a mobility scooter) driven by electric power. In this case, the fuel cell system 100 is connected to a battery 90 provided in the mobility 86 via a power supply line 88. In this case, the battery 90 provided in the mobility 86, a motor 92 of the mobility 86, and the fuel cell system 100 can be connected electrically in parallel, and they may be configured capable of switching a power supply destination by a switch to allow the battery 90 to be charged by the fuel cell system 100, and also to allow power supply to the motor 92.

Figure 15:
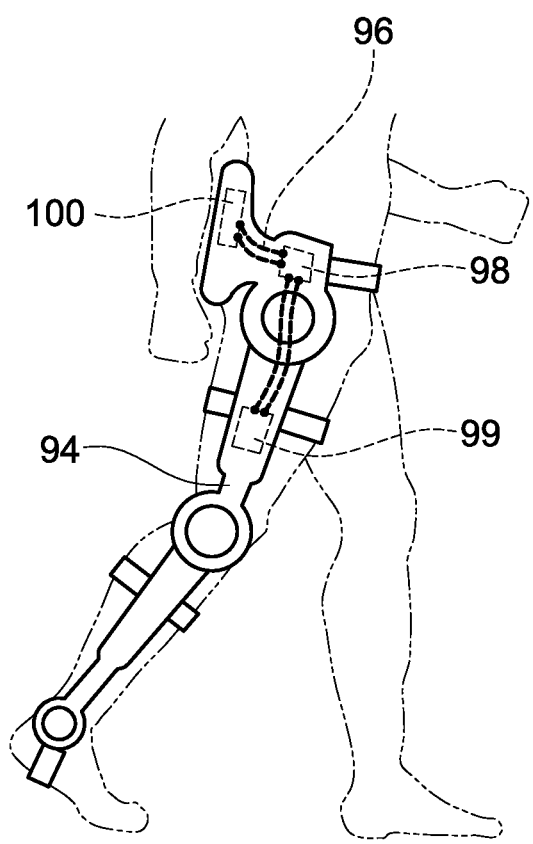
FIG. 15 is a diagram showing a yet another example of use of a fuel cell system of an embodiment.

Alternatively, as shown in FIG. 15, the fuel cell system 100 may be used as a sub battery mounted on a walking aid robot 94 driven by electric power. In this case, the fuel cell system 100 is connected to a battery 98 provided in the walking aid robot 94 via a power supply line 96. In this case, the battery 98 provided in the walking aid robot 94, a motor 99 of the walking aid robot 94, and the fuel cell system 100 can be connected electrically in parallel, and they may be configured capable of switching a power supply destination by a switch to allow the battery 98 to be charged by the fuel cell system 100, and also to allow power supply to the motor 99.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A fuel cell comprising:
   a substrate provided with a recess through which fuel gas passes;
   an electrolyte membrane covering the substrate;
   a first insulating film covering one surface of the electrolyte membrane and having a through hole positioned opposite to the recess;
   a first electrode in contact with the one surface of the electrolyte membrane at the through hole;
   a second electrode in contact with the other surface of the electrolyte membrane;
   a first heater embedded in the first insulating film at a position adjacent to the through hole and opposite to the electrolyte membrane;
   a second insulating film in contact with the second electrode in the recess, the second insulating film including a through hole positioned opposite to the through hole in the first insulating film; and
   a second heater embedded in the second insulating film at a position adjacent to the through hole of the second insulating film and opposite to the electrolyte membrane.

2. The fuel cell as in claim 1, wherein the first insulating film covers the electrolyte membrane opposite to the recess.

3. The fuel cell as in claim 1, wherein:
   the first insulating film comprises a plurality of the through holes, and
   the first electrode is provided so as to be in contact with the electrolyte membrane in each of the plurality of through holes.

4. The fuel cell as in claim 3, wherein:
   the plurality of through holes is arranged in a row, and
   the first heater is arranged to pass both sides of the row of the plurality of through holes.

5. The fuel cell as in claim 1, wherein a maximum width of the through hole of the first insulating film is less than 1 mm.

6. The fuel cell as in claim 1, wherein the first insulating film is a silicon nitride film or a multilayer film constituted of a silicon nitride film and a silicon oxide film.

* * * * *